US011533072B2

(12) United States Patent
Geiselhart et al.

(10) Patent No.: US 11,533,072 B2
(45) Date of Patent: Dec. 20, 2022

(54) TRANSMISSION OF BODY STATUS INFORMATION BY A WEARABLE COMPUTING DEVICE

(71) Applicant: INTERNATIONAL BUSINESS MACHINES CORPORATION, Armonk, NY (US)

(72) Inventors: Reinhold Geiselhart, Rottenburg-Ergenzingen (DE); Felix Beier, Haigerloch (DE); Knut Stolze, Hummelshain (DE); Luis Eduardo Oliveira Lizardo, Böblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/196,474

(22) Filed: Mar. 9, 2021

(65) Prior Publication Data
US 2022/0294484 A1 Sep. 15, 2022

(51) Int. Cl.
H04B 1/38 (2015.01)
H04B 1/3827 (2015.01)
G06F 3/01 (2006.01)
H04W 52/30 (2009.01)
H04W 76/10 (2018.01)

(52) U.S. Cl.
CPC ............ H04B 1/385 (2013.01); G06F 3/011 (2013.01); H04W 52/30 (2013.01); H04W 76/10 (2018.02)

(58) Field of Classification Search
CPC ...... H04B 1/385; H04W 76/10; H04W 52/03; G06F 3/011
See application file for complete search history.

(56) References Cited

U.S. PATENT DOCUMENTS

2018/0310867 A1 11/2018 Sivan
2021/0215789 A1* 7/2021 Hu .................... G01S 13/003
2021/0240720 A1* 8/2021 Muse ............... G06F 16/24564

FOREIGN PATENT DOCUMENTS

CN 108013883 A 5/2018

OTHER PUBLICATIONS

Disclosed Anonymously, "Method and System for Sensing Group State based on a Combination of Wearable Sensor Data," IP.com, Sep. 24, 2015, 4 pages, IP.com No. IPCOM000243492D.

(Continued)

Primary Examiner — Yuwen Pan
Assistant Examiner — Angelica M Perez
(74) Attorney, Agent, or Firm — Samuel A. Waldbaum

(57) ABSTRACT

A method for wearable computing device, the method comprising acquiring, by the wearable computing device, a first body status information of a person from a first data acquisition unit, wherein the person is wearing the wearable computing device. Receiving, by the wearable computing device, external information from other wearable computing devices via a wireless communication interface. In response to a fulfillment of a predefined crowd detection criterion by the external information, automatically, by the wearable computing device, transmitting the first body status information by the wireless communications interface.

19 Claims, 4 Drawing Sheets

(56) References Cited

OTHER PUBLICATIONS

IBM, "Crime Prediction and Prevention," IBM.com Datasheet [online], [accessed on Oct. 16, 2020], 3 pages, Retrieved from the Internet: <URL: https://www.ibm.com/industries/government/public-safety/crime-prediction-prevention>.

Mendoza, et al., "Assessment of fitness tracker security, A case study," MDPI Proceedings 2018, 11 pages, vol. 2, No. 19, 1235, DOI: 10.3390/proceedings2191235, Retrieved from the Internet: <URL: https://www.google.com/url?sa=t&rct=j&q=&esrc=s&source=web&cd=5&ved=2ahUKEwjnnO3wyMvIAhUFMewKHasZBCEQFjAEegQIAhAC&url=https%3A%2F%2Fwww.mdpi.com%2F2504-3900%2F2%2F19%2F1235%2Fpdf&usg=AOvVaw0E90fZd112HgEhNJ2_SXvH>.

Muaremi, et al., "Monitor and Understand Pilgrims: Data Collection using Smartphones and Wearable Devices," International Workshop on Human Activity Sensing Corpus and Its Application (HASCA2013), Sep. 2013, pp. 679-688, ACM, Zurich, CH, DOI: 10.1145/2494091.2495989, Retrieved from the Internet: <URL: https://www.ubicomp.org/ubicomp2013/adjunct/adjunct/p679.pdf>.

Rivera, "Towards Wearable Stress Measurement," MIT Libraries, Sep. 2015, 220 pages, Retrieved from the Internet: <URL: https://dspace.mit.edu/handle/1721.1/101849>.

\* cited by examiner

TRANSMISSION OF BODY STATUS INFORMATION BY A WEARABLE COMPUTING DEVICE

BACKGROUND

The present invention relates to wireless telecommunication by a wearable computing device.

Smart Watches and similar computer devices worn by a user (commonly known as "wearable computers" or "wearable" for short) have become increasingly common in recent years. They often have one or more sensor units to record values that can be interpreted as a direct or indirect measure of a current physiological state of their wearer. Often such devices contain a sensor to detect the pulse rate of the user. The wearable device can also have acceleration sensors or units to determine the geographical position (e.g., GPS) are also possible.

The wearable device has a wireless communication interface to transfer the acquired values to another computer device, such as a user's smartphone or PC, where they may be viewed and analyzed using dedicated software. An established standard for wireless transmission is Bluetooth, which enables encrypted communication via an exclusive pairing of the wearable with the user's desired computer.

BRIEF SUMMARY

Additional aspects and/or advantages will be set forth in part in the description which follows and, in part, will be apparent from the description, or may be learned by practice of the invention.

A method for wearable computing device, the method comprising acquiring, by the wearable computing device, a first body status information of a person from a first data acquisition unit, wherein the person is wearing the wearable computing device. Receiving, by the wearable computing device, external information from other wearable computing devices via a wireless communication interface. In response to a fulfillment of a predefined crowd detection criterion by the external information, automatically, by the wearable computing device, transmitting the first body status information by the wireless communications interface.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
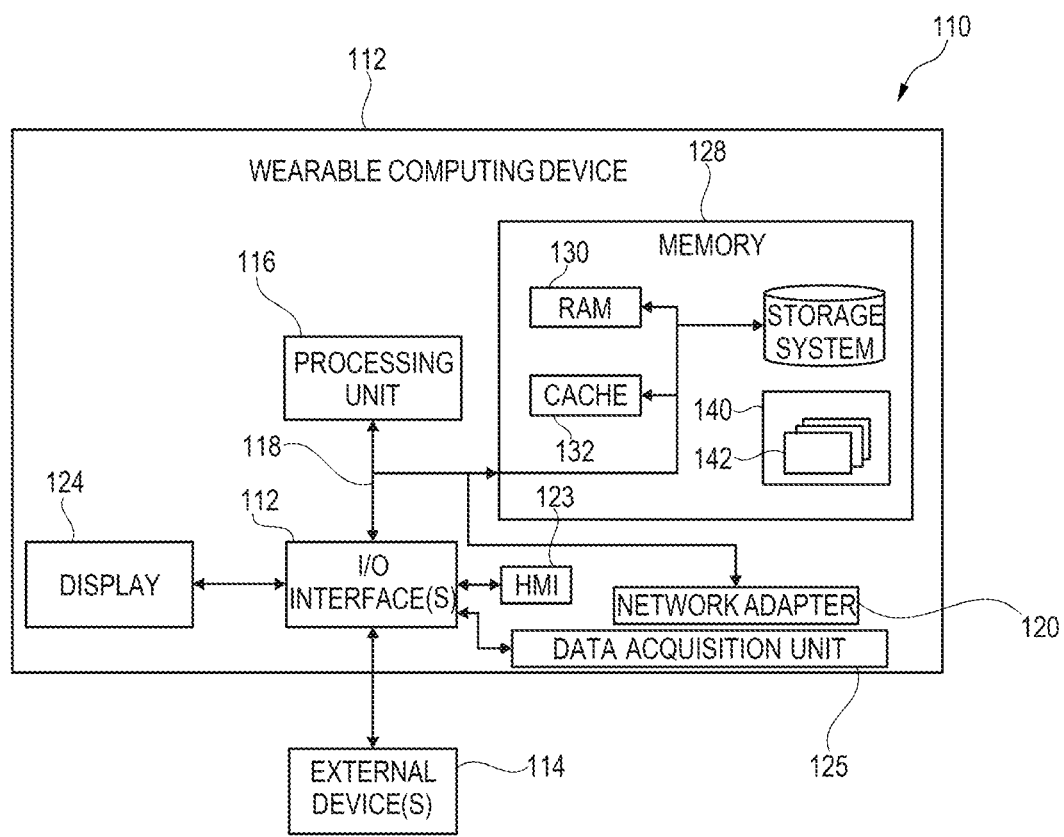
FIG. 1 depicts a block diagram of a wearable computing device, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

At gatherings of people there is a public interest in the safety of the participants. Early detection of changes in crowd condition and behavior by (public) security units can help support this interest. Publications in recent years indicate that body status information such as emotional states or behavioral patterns of a person may be automatically detected based on the data collected by a wearable computing device. Data is typically transmitted in encrypted form to the user's computing device from the wearable device, for example, via a BLUETOOTH® pairing with a smartphone.

The wearable computing device (in the following also referred to as "wearable") is adapted for acquiring first body status information of the person wearing the wearable, using its first data acquisition unit. The first body status information may include any kind of information related to the person's body, including, but not limited to, information regarding a current physiological condition of the person (e.g., a skin conductance, a pulse frequency or an inclination angle of a body part to which the wearable is attached). The first body status information may likewise include non-physiological information related to the person's body, such as a current geographic position and/or velocity of the wearable computing device, or a noise level at the wearable's current position.

The wearable is equipped with a wireless communications interface that is adapted for receiving signals from other devices nearby. The wireless communications interface may have a limited range based on a maximum power output (e.g., 100 mW) at the signal antenna that may be similar to the respective ranges of the nearby devices. The wireless communications interface may be adapted for sending and receiving signals within a design frequency range that overlaps with the frequency ranges of the nearby devices. In particular, the wireless communications interface may be adapted for establishing wireless personal area network (WPAN) connections, which may include exclusive connections to a "coupled" or "paired" device. Any signal received by the wearable from another device that has not already established an exclusive connection to the wearable computing device (i.e., that is not coupled to or paired with the wearable computing device) is referred herein as external information. Any receipt and processing of external information may be independent of any exclusive connection the wearable may establish using the wireless communications interface. In a non-exclusive example, the wireless communications interface is adapted for establishing connections such as pairing connections according to a BLUETOOTH® standard such as BLUETOOTH LOW ENERGY® (BLE). Other standards and protocols, including other WPAN types such as ANT/ANT+, may likewise be implemented.

The wearable computing device may receive the external information without prejudice. Likewise, the wearable computing device may filter the external information by device type, as far as such information is readable within the external information. For instance, the wearable computing device may ignore any signals of external information that were transmitted by devices other than wearable computing devices. In an example, other devices may be recognized, e.g., if the external information contains advertisement data that is broadcast for bonding/pairing/coupling with a master device, or by other data that is transferred. Another example, between one of the other devices and its corresponding master device and contains information identifying the respective device as a wearable computing device that is likewise configured for acquiring body status information of another person.

Identifying nearby devices as wearable computing devices may ensure that the interpretation of traits of the incoming external information. For example, a person may be in a crowd, rather than another location that has installed multiple static computing devices with wireless communication functionality (e.g., desktop computers, printers). By applying a predefined crowd detection criterion, the wearable computing device may determine whether the person operating the wearable is likely located in or near a crowd. If the external information fulfills the crowd detection criterion, the first body status information is transmitted by the wireless communications interface. This may include that the transmission may be stopped if the external information indicates that the crowd detection criterion is no longer fulfilled. The transmission of the first body status information is not started if the crowd detection criterion is not fulfilled. Moreover, any requirement included in the crowd detection criterion, as disclosed herein, that may have to be fulfilled by the external information in order to start the transmission of the first body status information does not exclude that the crowd detection criterion may comprise further requirements (also called "subcriteria" herein) that have to be fulfilled additionally ("and"-conjunction of subcriteria) before starting the transmission of the first body status information. The crowd detection criterion may refer to any trait of the external information, which does not necessarily mean that the crowd detection criterion be based on a kind of semantic content encoded by the external information. Rather, there may be cases where, e.g., the number of signals received as the external information, or the number of different devices that may be discerned within the external information, may be used as indications of the number of devices nearby, and thus, of the number of persons near the person wearing the wearable computing device.

The transmitted first body status information may not be transmitted to a particular receiver, which may increase communication efficiency because the wearable may not have to identify a desired recipient within a plurality of devices within the range of the wireless communications interface. The transmitted body status information may be received as external information by any device equipped with a wireless interface matching the wireless communications interface. The wireless communication interface may, but not necessarily, use an idle channel for the transmission of the first body status information. This may include the possibility that the wearable may have established some connection, including but not limited to a bonding/coupling/pairing connection, on a busy channel using the wireless communications interface while transmitting the first body status information. Likewise, the wearable computing device may use the wireless communications interface for transmitting the first body information via an existing connection that may have been established earlier or may establish a connection to a predefined desired recipient in order to transmit the first body status information to that recipient. This may include connecting to a third device and causing the third device to route or forward the first body status information to the desired recipient.

Embodiments of the invention may have the advantage that the presence, and optionally the content, of external information may be used as a means for detecting the gathering of a crowd by a wearable computing device. Especially when implementing a content-independent approach, this may be achieved with a low amount of data processing.

The presence of a crowd may indicate that the public interest in protection of the attendants may exceed the confidentiality interest of the person wearing the wearable computing device regarding the first body status information. The confidentiality interest is a usual reason for encrypting any transmission of body status information by a wearable computing device, such that it is unavailable to the public. An exceeding public interest may, however, require an early detection of changes in crowd condition and behavior by security units deployed for protecting the crowd (e.g., a public security unit such as police, fire service, medical service; but possibly also security personnel associated with an event hosting the given crowd). Publications in recent years indicate that body status information such as emotional states or behavioral patterns of a person may be automatically detected based on the data collected by a wearable computing device worn and operated by the person. For example, physiological quantities such as the pulse frequency may be used as a measure of a stress level of a person. Another example, a geographical velocity ("running speed") or an inclination angle of a body portion to which the wearable is attached may indicate an emergency. Another example, a geographical position of the wearable may allow for detecting a trespassing event.

When such body status information is accessible to security units, they may be notified earlier about changes in (e.g., average) stress level of the crowd, or suddenly occurring hazard or emergency situations. Therefore, embodiments of the present invention may have the advantage of enabling an earlier response to events requiring protective measures to or within the crowd. Security units may operate a receiving computing device for this purpose that, e.g., is adapted for receiving any body status information from the crowd, detecting significant changes, e.g., of the body status information received from each device separately and/or of an aggregate or derived measure of the total body status information received, e.g., within a predefined time window, and output a warning signal or message if a significant change is detected.

Moreover, the transmission of the first body status information under the condition of detecting a crowd may warrant data protection for the person wearing the wearable computing device. An assignment of the transmitted information to a particular person within a crowd may be difficult without additional information such as direct or video-borne visual inspection. The transmitted signal carrying the body status information may not be assigned to an individual person in a crowd because there may be a large number of signals coming from the same area where the wearable transmitting the body status information is located. The person wearing and operating the transmitting wearable computing device may be regarded as "hiding in the crowd". By this, the confidentiality of the person's data may be protected, but at the same time a rescue unit may be made aware of an incident in said area. Embodiments of the invention may thus allow for a public transmission of body status information with an at least passive data protection. If the transmission is addressed to a specific recipient, encryption may be used, nonetheless.

According to an embodiment, the device is further adapted for performing the acquisition of the first body status information by sensing a physiological function of the person, the first body status information being based on the physiological function. This may allow for a computer-based detection of, e.g., visually or acoustically unknowable changes in an emotional state (e.g., fear, stress) or health-related condition (e.g., dizziness, overheating, hypoglycemia) of the person.

According to an embodiment, the fulfillment of the crowd detection criterion requires that the external information comprises external body status information. This may enable an earlier transmission of the first body status information by implementing a "chain reaction". When another wearable computing device also supports automatic transmission of body status information based on fulfillment of a predefined crowd detection criterion, it may already have determined that its respective crowd detection criterion is fulfilled and may have started transmitting the body status information of its respective wearer in response thereto. The wearable computing device worn by the person may then assume that the public transmission of body status information is an indication of being in a crowd and may thus skip determining whether the present crowd detection criterion is fulfilled and immediately start transmitting the first body status information. External body status information may be recognized as such by appropriate keywords (e.g., indicating a payload type "body status information" or a specific type of body status information such as "pulse frequency") or other standardized identifiers known to the wearable computing device.

As stated further above, the requirement for fulfillment of the crowd detection criterion according to the present embodiment includes that the first body status information be not publicly transmitted if said requirement is false, and does not exclude that additional requirements may exist that also have to be true in order to assert complete fulfillment of the crowd detection criterion.

According to an embodiment, the fulfillment of the crowd detection criterion further requires that the external body status information be received as a wireless personal area network (WPAN) broadcast message. This may consider that body status information is normally transmitted as an encrypted message on an exclusive channel, while broadcast messages are usually sent to perform "advertising", i.e., requesting unpaired computing devices for coupling on an exclusive channel. When the wearable computing device receives body status information as a broadcast message, it may be sure that the external body status information was transmitted deliberately and that a crowd has already been successfully detected by another device. In addition, the broadcast via a WPAN may allow the wearable to automatically filter out signals from devices that are not wearable computing devices.

As stated further above, the requirement for fulfillment of the crowd detection criterion according to the present embodiment includes that the first body status information be not publicly transmitted when the crowd detection criterion is false. This does not exclude that additional requirements may exist that also have to be true in order to assert complete fulfillment of the crowd detection criterion.

According to an embodiment, the first body status information comprises one or more body factors, such as, a heart rate, a body temperature, a skin conductance, a breathing frequency, an acceleration, a geographic position, a geographic velocity, a blood sugar level, a posture angle, a step frequency, and a loudness level. These quantities may be especially advantageous for detecting changes in the person's condition which, taken alone or in conjunction with body status information from other wearables nearby, are desirable to be addressed by a security unit (e.g., a public security unit such as police, fire service, medical service; but possibly also security personnel associated with an event hosting the given crowd). Changes in emotional (e.g., fear, stress) or health-related conditions (e.g., dizziness, overheating, hypoglycemia) of the person may be detected. Changes in the person's behavior or realization of a behavioral pattern, probably in response to events perceived as hazardous, may be detected using one or more of the quantities stated above. A non-exhaustive list of exemplary data acquisition units includes a GPS receiver or similar device for determining geographic quantities, an acceleration sensor for detecting acceleration-related quantities such as a posture angle relative to gravity, and a continuous glucose sensor placed under the skin and read out using a near-field technique.

According to an embodiment, the transmission of the first body status information comprises broadcasting the first body status information as external information. Using broadcast messages for transmitting body status information may facilitate sustaining existing connections of the transmitting wearable computing device and may ensure that receiving devices do not ignore them as messages on an exclusive or busy channel.

According to an embodiment, the first body status information is encrypted before being broadcasted. This may increase the protection of the person's data. For example, recording of the first body status information by an unauthorized device may be prevented. Encryption may include, e.g., using a symmetric key pair that is known only to the transmitting device and a predefined recipient device (e.g., a police computer). If encryption is used, the broadcast message may contain a standardized indication that the encrypted broadcast message contains body status information. This may enable other wearables receiving the transmitted first body status information as external information to recognize the transmission of the first body status information by the wearable computing device without coming to know the actual first body status information.

According to an embodiment, the transmission of the first body status information comprises addressing the first body status information to a predefined recipient. This may enable third devices, such as other wearables nearby receiving the transmitted first body status information as external information, to ignore the first body status information. Another advantageous possibility may be a receipt of the first body status information by a device connected to a larger network (e.g., the internet) and route the first body status information to the recipient using the network.

According to an embodiment, the device is further adapted for establishing an exclusive pair connection with a pairing device via a wireless personal area network pair connection channel by the wireless communications interface. Performing the transmission of the first body status information via an auxiliary channel other than the wireless personal area network pair connection channel and sustaining the pair connection while performing the transmission of the first body status information. This may be an advantageous enhancement for protocols of the types included in the BLUETOOTH® standard that usually implement exclusive connections ("bonding", "pairing") between two devices. By sustaining the pair connection while transmitting the first body status information via an auxiliary channel, the pair connection may be continued without interruption or disturbance by the transmission of the first body status information. In this way, the conditional transfer of body status information, as disclosed herein, may be implemented without violation of the standards and protocols used by the wireless communications interface as a default. It may also be possible to implement the conditional transfer of body status information, as disclosed herein, without having to change the standards and protocols used by the wireless communications interface as a default.

According to an embodiment, the device is further adapted for performing the transmission of the first body status information with a higher transmission power than a predefined upper limit of transmission power specified for the pair connection channel. This may allow for reaching a desired recipient that is presumably located at a greater distance from the wearable than the pairing device. Preferably, the first body status information may be transmitted at a rated maximum transmission power to maximize the probability of reaching a desired recipient such as a computer operated by a security unit outside of the crowd.

According to an embodiment, the device further comprises a second data acquisition unit adapted for acquiring second body status information of the person. The fulfillment of the crowd detection criterion requiring that an indicator quantity described by or derived from the external information exceeds a predefined first threshold. The fulfillment of the crowd detection criterion further requiring that the indicator quantity exceeds a predefined second threshold, wherein exceeding the second threshold includes exceeding the first threshold.

Checking the external information against two different thresholds of the same indicator quantity and transmitting different portions of the person's available body status information in a staggered sequence depending on whether only the first threshold has been exceeded or the first and the second threshold together may. When there is a large number of wearable computing devices transmitting body status information at the same time causes a reduction in the total amount of body status information that is synchronously transmitted. Thus, reduce the bandwidth consumption of the multiple synchronous transmissions. In addition, there may be an improved protection of the person's data because not all available body status information is transmitted if a crowd is detected.

It is understood that "exceeding a threshold" means herein that the indicator value may go above, equal to, or fall below the respective threshold, depending on whether the indicator quantity is an increasing or decreasing quantity. As stated further above, the requirement for fulfillment of the crowd detection criterion is false then according to the present embodiment includes that the first body status information be not publicly transmitted. This does not exclude that additional requirements may exist that also have to be true in order to assert complete fulfillment of the crowd detection criterion.

According to an embodiment, the first body status information comprises one or more body factors, such as, an acceleration, a geographic position, a geographic velocity, and a loudness level. The second body status information comprises one or more body factors, such as, a heart rate, a body temperature, a skin conductance, a breathing frequency, a blood sugar level, a posture angle, and a step frequency.

This partition of the body status information may provide an improved bandwidth reduction in case that only the first threshold is surpassed because a smaller amount of data (e.g. body information) is transmitted. For example, the pulse frequency is typically among the body status information that is regularly acquired with a high frequency, so the payload to be transmitted by the wearable may be smaller because a smaller number of values has to be transmitted. In addition, this partition may offer an improved protection for the person's physiological information.

According to an embodiment, the fulfillment of the crowd detection criterion requires that a currently detected number of the other wearable computing devices and/or a current average velocity of the other wearable computing devices exceeds a respective predefined third threshold, as respectively indicated by the external information. A currently detected number of other wearable computing devices may be useful for detecting a crowd, assuming that the number of wearables within coverage of the wireless communications interface is proportional to the number of persons near the person wearing the wearable computing device. An advantage may be that the number of wearables nearby may be determined with a low consumption of computing resources of the wearable, e.g., by counting the number of devices from which the external information is received. The number of nearby devices may be obtained passively by listening to any signals that are received by the communications interface, or actively by scanning the environment for other wearables and registering any responses to the scanning request. The number of detected wearables can be interpreted as a number density by assuming a constant sensing range of the wireless communications interface.

Moreover, starting the transmission of the first body status information based on the current average velocity of the other wearables (i.e., a velocity figure averaged over all nearby devices for which geographical velocity information is available) may allow for detecting a least average velocity and/or a least change of the average velocity. In this way, the detection of situations that may require attendance by a security unit may be performed by the wearable computing device instead of a presumed receiver of the body status information. This may have the effect that the first body status information is transmitted less often, thus, reducing the bandwidth requirement for the transmission of body status information by multiple wearables. In addition, a receiver of the first body status information may prioritize the receipt of body status information that was transmitted under an average-velocity condition. An assessment of a potentially critical situation within the crowd has already been performed by the wearable computing device. For this purpose, the wearable may add a descriptor to the transmitted body status information that signals the increased priority of the first body status information in the payload data. An average velocity of wearable computing devices may be obtained directly, i.e., when the external information comprises geographical velocity data, or indirectly from geographical position data within the external information.

According to an embodiment, the device is further adapted for completing the transmission of the first body status information within ten seconds after the acquisition of the first body status information. This may reduce the memory requirement of the wearable computing device for caching the first body status information before the transmission (which is still subject to the fulfillment of the crowd detection criterion). Furthermore, this may ensure that the first body status information, when received as external information by a recipient, reflects an ongoing situation.

According to an embodiment, the device is further adapted for excluding identifying information of the wearable computing device and/or the person from the transmission of the first body status information. This may reduce the bandwidth requirement of the transmission, which may become significant, e.g., if a large number of wearables transmits body status information simultaneously. Moreover, this may provide an improved protection of the person's data because no information assignable to the person is transmitted to the public. The identifying information prevented from the transmission may include, without limitation, information assignable to the person such as name, address, age, identification number, public insurance number, as well as a unique identifier of the wearable computing device or one of its components, such as a processor ID, a network client name, a MAC® address, etc.

According to an embodiment, the external information comprises a pairing request broadcasted by one of the other wearable computing devices while scanning for a potential external pairing device. Alternatively, a communication signal transmitted on an exclusive wireless personal area network pair connection channel between one of the other wearable computing devices and an assigned external pairing device. This may facilitate determining the number of other wearable computing devices nearby by counting the number of signals. This may facilitate filtering out any sources of external information (e.g., static computing devices) that appear unsuitable for detecting the presence of a crowd because they are unlikely suppliers of current body status information.

A wearable computing device and another wearable computing device, both located within mutual wireless coverage, may form a system comprising a first and a second wearable computing device, each comprising a wireless communications interface. The first and second wearable computing devices include a data acquisition unit adapted for respectively acquiring body status information of a first and a second person respectively wearing the first and the second wearable computing device. The first wearable computing devices acquires the body status information of the first person by the data acquisition unit and receives external information from other wearable computing devices by the wireless communications interface. A fulfillment of a predefined crowd detection criterion by the external information, automatically transmitting body status information of the first person by the wireless communications interface. The second wearable computing device being adapted for acquiring the body status information of the second person by the data acquisition unit. The second wearable devices receive the body status information of the first person as external information from the first wearable computing device by the wireless communications interface. A fulfillment of a predefined crowd detection criterion by the body status information of the first person, automatically transmitting body status information of the second person by the wireless communications interface.

Embodiments of the present invention may be implemented using a computing device that may also be referred to as a wearable computer system. Referring now to FIG. 1, a schematic of an example of a wearable computer system 110 is shown. Wearable computer system 110 is only one example of a suitable computer system and is not intended to suggest any limitation as to the scope of use or functionality of embodiments of the invention described herein. Regardless, wearable computer system 110 is capable of being implemented and/or performing any of the functionality set forth hereinabove.

In wearable computer system 110 there is a wearable computing device 112, which is operational with numerous other purpose computing system environments or configurations. Examples of well-known computing systems, environments, and/or configurations that may be suitable for use with wearable computing device 112 include, but are not limited to, wearable computer systems, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Wearable computing device 112 may be described in the context of computer system executable instructions, such as program modules, being executed by a computer system. Generally, program modules may include routines, programs, objects, components, logic, data structures, and so on that perform particular tasks or implement particular abstract data types. Wearable computing device 112 may be practiced in distributed computing environments where tasks are performed by remote processing devices that are linked through a communications network. In a distributed computing environment, program modules may be located in both local and remote computer system storage media including memory storage devices.

As shown in FIG. 1, wearable computing device 112 in wearable computer system 110 is shown in the form of a computing device. The components of wearable computing device 112 may include, but are not limited to, one or more processors or processing units 116, a system memory 128, and a bus 118 that couples various system components including system memory 128 to processor 116. Bus 118 represents one or more of any of several types of bus structures, including a memory bus or memory controller, a peripheral bus, an accelerated graphics port, and a processor or local bus using any of a variety of bus architectures. Bus 118 may implement any present or future standard or proprietary architecture. By way of example, and not limitation, known standard architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Wearable computing device 112 may further comprise one or more human-machine interface devices 123, such as buttons or other operating elements allowing a user to input control signals and/or other information. Wearable computing device 112 may further comprise one or more data acquisition units 125 that, by way of example only, may be adapted for determining (measuring or obtaining) body status information that may include physiological information of a person wearing the wearable computing device 112.

For example, a heart rate or pulse frequency, a body temperature, a skin conductance, a breathing frequency, a blood sugar level, a posture angle, and a step frequency, without limitation, or other non-physiological status information related to the wearer's body, for example, an acceleration, a geographic position, or a geographic velocity of the wearable computing device 112, and a loudness level perceived at the wearable computing device 112.

Wearable computing device 112 typically includes a variety of computer system readable media. Such media may be any available media that is accessible by wearable computing device 112, and it includes both volatile and non-volatile media, removable and non-removable media.

System memory 128 can include computer system readable media in the form of volatile memory, such as random access memory (RAM) 130 and/or cache memory 132. Wearable computing device 112 may further include other removable/non-removable, volatile/non-volatile computer system storage media. By way of example only, storage system 134 can be provided for reading from and writing to a non-removable, non-volatile solid-state media (not shown and typically called a "hard drive"). In a further example, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided as external devices 114. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Wearable computing device 112 may also communicate with one or more external devices 114 such as a keyboard, a pointing device, a display 124, etc.; one or more devices 123 that enable a user to interact with wearable computing device 112; and/or any devices (e.g., a wireless network adapter) that enable wearable computing device 112 to communicate with one or more other computing devices. Such communication can occur via Input/Output (I/O) interfaces 122. Still yet, wearable computing device 112 can communicate with one or more networks such as a wireless personal area network (WPAN) via wireless network adapter 120. As depicted, network adapter 120 communicates with the other components of wearable computing device 112 via bus 118. It should be understood that although not shown, other hardware and/or software components could be used in conjunction with wearable computing device 112. Examples, include, but are not limited to: microcode, device drivers, redundant processing units, external disk drive arrays, RAID systems, tape drives, and data archival storage systems, etc.

A computer system such as the wearable computer system 110 as shown in FIG. 1 may be used for performing operations disclosed herein such as automatic transmission of body status information, acquired by the data acquisition unit 125, by a wireless network adapter 120 (also referred to as wireless communications interface 120) based on a fulfillment of a predefined crowd detection criterion by external information received by wireless network adapter 120. Such computer system may be a "standalone" computer that is not bonded (coupled/paired via an exclusive network connection, e.g., under the Bluetooth standard) with another computing device (e.g., a smartphone operated by the user wearing the wearable computing device 112). Such operation may, however, likewise be performed while being bonded (coupled/paired via an exclusive network connection) with such other computing device.

Figure 2:
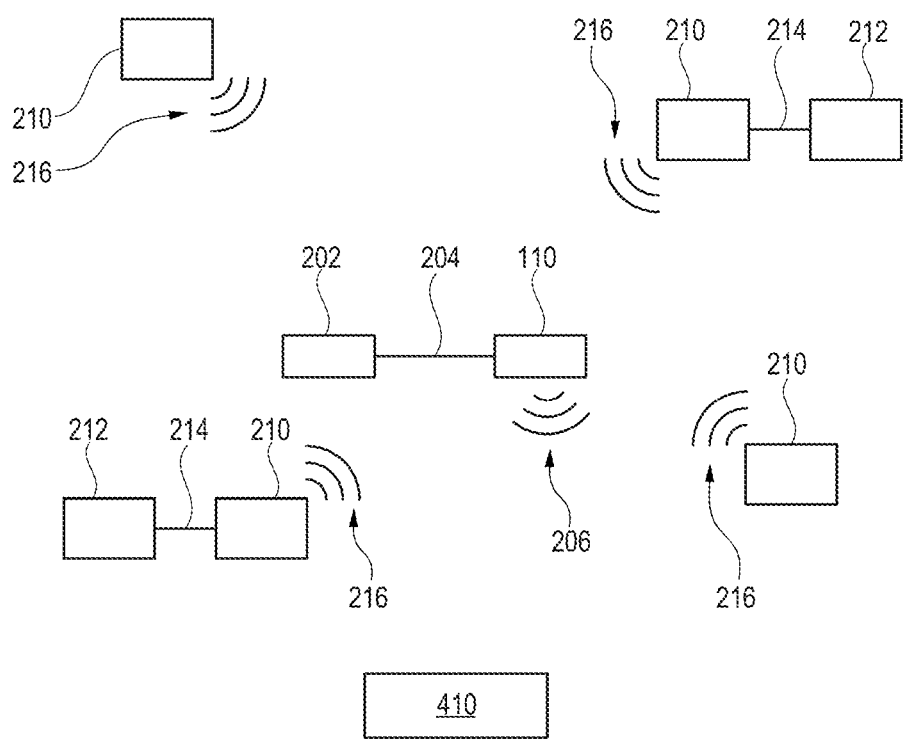
FIG. 2 depicts a schematic environment of a wearable computing device in operation, in accordance with an embodiment of the present invention.

FIG. 2 shows a schematic drawing of an exemplary environment where the wearable computer system 110 may be operated. In the non-exhaustive example of FIG. 2, wearable computer system 110 is bonded (coupled, paired) to a pairing device 202 (e.g., a smartphone operated by the user wearing the wearable computing device 112) by an exclusive wireless personal area network (WPAN) connection 204.

The pair formed by the wearable computer system 110 and the pairing device 202 is surrounded by several external computing devices 210, 212, 410 that are located within coverage of the wireless communications interface 120. Likewise, the wearable computer system 110 and/or the pairing device 202 may be within coverage within one or more of the external computing devices 210, 212, 410. The external computing devices 210, 212, 410 may comprise external wearable computing devices 210, of which some also form pairs with external pairing devices 212 by a exclusive network connections 214, and some further of the external wearable computing devices 210 are operated as standalone or uncoupled devices.

In the example of FIG. 2, the wearable computer system 110 receives signals carrying external information 216 from some of the external computing devices 210. The external information 216 may be carried by signals that are exchanged between the coupled devices 210, 212 on their respective exclusive channels 214, or by other signals such as broadcasted advertising messages transmitted by uncoupled wearable devices 210 scanning the environment for possible pairing devices 212.

During operation, the wearable computer system 110 uses its data acquisition unit 125 to acquire body status information of a person (not shown) operating and wearing the wearable computer system 110. Upon receipt of the external information 216, the wearable computer system 110 checks (e.g., in regular time intervals) whether a trait of the received external information 216, for example, a number of wearable devices 210 nearby derived from the number of received external signals 216. Alternatively, predefined information included in the external information 216, for example, external body status information as disclosed herein, or a dedicated label indicating that a crowd has already been detected, fulfills a predefined crowd detection criterion (e.g., the number of wearable computing devices nearby is at least twenty, and/or the external information 216 comprises a broadcast message encoding body status information of other persons).

When the crowd detection criterion is fulfilled, the wearable computer system 110 transmits a recent portion 206 of the body status information. The transmission of the body status information 206 may be performed independent (simultaneously, in parallel) of the existing bonding connection 204. The transmitted body status information 206 may be received by the surrounding devices 210, 212, 410 as external information.

External device 410 may be a recipient computing device 410 that is dedicatedly operated for receiving body status information from the wearable computer system 110 and the wearable computing devices 210. In an example, receiving device 410 is configured for receiving body status information by a wireless communications interface 420, and in response thereto, issuing an alarm message containing at least a portion of the received body status information by a user interface such as a display 424.

In an application scenario, a host holds an event such as a concert, a game, or a demonstration that causes a gathering of multiple (e.g., several hundred) attendants. The gathering is accompanied by public security units such as police and a medical emergency team, as well as a commercial security service ordered by the host. Some of the attendants wear and operate respective wearable computing devices 110, 210 such as smart watches, fitness trackers, etc. The wearable computing devices 110, 210 may comprise wearable computing systems 110 that may be configured for conditional public transmission of acquired body status information as disclosed herein, and wearable computing devices 210 may be configured for acquisition of body status information without actively participating in the procedures disclosed herein by conditional transmission of body status information.

The wearables 110 may be configured for detecting the presence of the other wearable devices 110, 210 by scanning or listening (lower energy-consuming). In the non-exhaustive example of this application scenario, it is assumed for simplicity that all wearables 110 may apply the identical crowd detection criterion that a crowd is detected if ten or more wearables 110, 210 are identified. In a real application, the wearables 110 may have different thresholds and may apply crowd detection criteria other than counting transmitting wearable devices. In the scenario, the total number of wearables 110, 210 operated by the gathered attendants may be sixty, and each wearable 110 may detect between ten to thirty of the sixty gathered wearables 110, 210, with detection losses due to limited spatial coverage of the respective wireless communications interfaces 120. Each wearable 110, 210 may then assert that the crowd detection criterion of at least ten wearables 110, 210 nearby is fulfilled, and may subsequently start transmitting body status information that was recently (e.g., within the last ten seconds) acquired from the respective wearer.

The transmission of the body status information may be performed directly, i.e., without sending the body status information to an intermediate station for forwarding the body status information to an unknown recipient or a desired recipient 410. However, it may also be possible to use surrounding devices, such as a pairing device 202 to which the wearable 110 is bonded, or a wireless router installed in a facility where the event takes place, for forwarding the body status information to an unknown recipient or a desired recipient 410. Forwarding of body status information to an unknown recipient may be supported if the forwarding device is configured to recognize messages containing body status information and knows (or can determine, e.g., using an internet connection) a suitable recipient 410 that is known (e.g., certified) to be able to handle the body status information appropriately.

For the sake of simplicity of explanation, it is assumed further that each wearable 110 may, e.g., be equipped with a pulse sensor, and correspondingly, the body status information transmitted 206 by the wearables 110 comprises the wearer's pulse frequency (heart rate). The transmitted pulse frequencies may be received as external information by the network adapter 420 of a computing device 410 that is operated by the accompanying security units for the purpose of crowd monitoring. The recipient device 410 may execute an application that may be configured for aggregating the received pulse frequencies to an average value (e.g., the arithmetic average) and outputting an alarm message such as "Crowd detection: Positive. Average heart rate: 96". This may allow security personnel to monitor the course of the average pulse frequency during the event, and to start a response action if, for instance, the computing device 410 indicates a sudden increase in the average pulse frequency.

The wearables 110 may also be useful in other possible scenarios, such as smaller meetings (e.g., a presentation) or gatherings with a larger spatial distribution (e.g., a traffic jam or a festive procession). For instance, a preconfigured crowd detection threshold of, e.g., ten or more wearable devices 110, 210 may still be effective on smaller meetings because such events may take place in a smaller facility that warrants a more complete overlap of the respective spatial coverages. At gatherings with a larger spatial distribution, it may be helpful to implement a redirect mechanism by default that uses pair devices 202 of the wearables 110 as transmitters with a typically higher transmission power, and wireless network infrastructure such as wireless antennas, routers and repeaters that may be installed, e.g., along the highway where the traffic jam occurs (where the recipient device 410 may be, e.g., a computer of the highway police) or the street hosting the procession.

Figure 3:
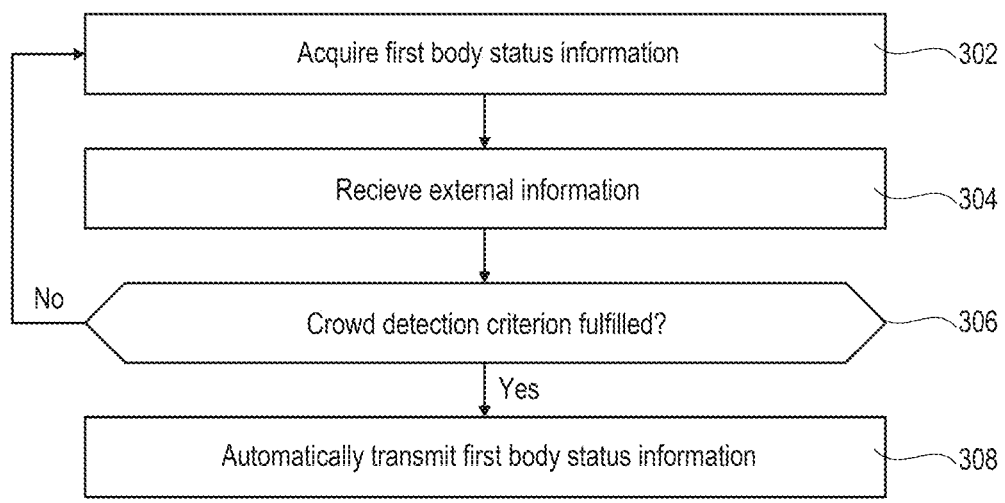
FIG. 3 depicts a flow diagram illustrating a method of operating a wearable computing device, in accordance with an embodiment of the present invention.

FIG. 3 shows a flow diagram illustrating an exemplary method of operating a wearable computer system 110 that is equipped with a data acquisition unit 125 and a wireless communications interface 120. In a step 302, the wearable computer system 110 uses the data acquisition unit 125 to acquire body status information (e.g., a physiological or geographical quantity or an acceleration) of a person operating and wearing the wearable computer system 110. In a step 304, which may be executed in parallel to the acquisition 302, the wearable computer system 110 receives external information from external wearable devices 210 nearby that are also equipped with a wireless communications interface. In a step 306, the wearable computer system 110 determines whether a trait of the received external information (e.g., a number of wearable devices nearby derived from the number of received signals, or a particular, predefined (e.g., dedicated) information included in the external information 216) fulfills a predefined crowd detection criterion (e.g., the number of wearable computing devices nearby is a predetermine number such as at least twenty, and/or the external information 216 comprises a broadcast message encoding body status information of other persons).

If the external information 216 that was received during step 304 fulfills the crowd detection criterion, the wearable computer device 110 uses the wireless communications interface 120 to transmit 308 at least a (recent) portion of the body status information that was acquired during step 302. Subsequently, or parallel to the transmission 308 of the body status information, the method may continue with acquiring 302 further body status information of the person and receiving 304 further external information 216 from external wearable computing devices 210 nearby. If the crowd detection criterion is not fulfilled, the wearable computer system 110 continues with acquiring 302 body status information of the person and receiving 304 external information 216 from external wearable computing devices 210 nearby.

Figure 4:
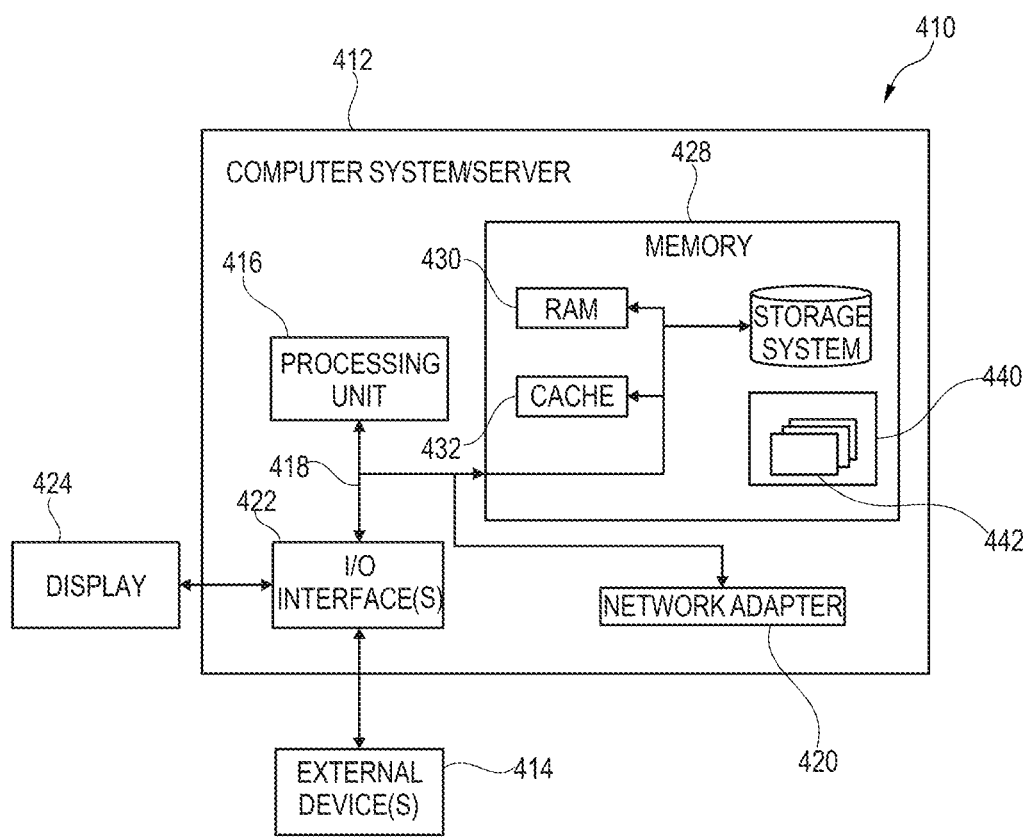
FIG. 4 depicts a block diagram of a recipient computing device, in accordance with an embodiment of the present invention.

Embodiments of the present invention may comprise a recipient computer system that may be implemented using a computing device that may also be referred to as a computer system, a client, or a server. Referring now to FIG. 4, a schematic of an example of a recipient computer system is shown. Recipient computer system 410 is only one example of a suitable computer system and is not intended to suggest any limitation as to the scope of use or functionality of embodiments of the invention described herein. Regardless, recipient computer system 410 is capable of being implemented and/or performing any of the functionality set forth hereinabove.

In recipient computer system 410 there is a computer system/server 412, which is operational with numerous other general purposes or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed computing environments where tasks are performed by remote processing devices that are linked through a communications network. In a distributed computing environment, program modules may be located in both local and remote computer system storage media including memory storage devices.

As shown in FIG. 4, computer system/server 412 in recipient computer system 410 is shown in the form of a general-purpose computing device. The components of computer system/server 412 may include, but are not limited to, one or more processors or processing units 416, a system memory 428, and a bus 418 that couples various system components including system memory 428 to processor 416. Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

A computer system such as the recipient computer system 410 shown in FIG. 4 may be used for performing operations disclosed herein such as receiving external information comprising body status information 206 by the communications interface 120 (e.g., directly via a wireless interface, or indirectly as a message forwarded via a network that does not necessarily have to be wireless), and in response thereto, issuing an alarm message comprising at least a portion of the received body status information 206 by a user interface such as the display 424. Such computer system may be a standalone computer with no active network connection that, however, may receive data to be processed via a signal received from a network through a local interface. Such operation may, however, likewise be performed using a computer system that is connected to a network such as a communications network and/or a computing network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for a wearable computing device, the method comprising:
   acquiring, by the wearable computing device, a first body status information of a person from a first data acquisition unit, wherein the person is wearing the wearable computing device;
   receiving, by the wearable computing device, external information from other wearable computing devices via a wireless communication interface;
   in response to a fulfillment of a predefined crowd detection criterion by the external information, automatically, by the wearable computing device, transmitting the first body status information by the wireless communications interface;
   acquiring, by the wearable computing device, a second body status information of the person, wherein the second body status information is acquired by a second data acquisition unit; and
   in response to the fulfillment of the crowd detection criterion comprising that an indicator quantity described by or derived from the external information exceeds predefined first threshold, wherein the fulfillment of the crowd detection criterion further comprises that the indicator quantity exceeds a predefined second threshold, wherein exceedance of the second threshold includes exceedance of the first threshold.

2. The method of claim 1, wherein the acquisition of the first body status information comprises sensing a physiological function of the person, wherein the first body status information being based on the physiological function.

3. The method of claim 1, wherein the fulfillment of the crowd detection criterion comprising that the external information comprises external body status information.

4. The method of claim 3, wherein the fulfillment of the crowd detection criterion further comprising that the external body status information is received as a wireless personal area network broadcast message.

5. The method of claim 1, wherein the first body status information is selected from a group consisting of one or more a heart rate, a body temperature, a skin conductance, a breathing frequency, an acceleration, a geographic position, a geographic velocity, a blood sugar level, a posture angle, a step frequency, and a loudness level.

6. The method of claim 1, further comprising:
   transmitting, by the wearable computing device, the first body status information comprising broadcasting the first body status information as external information.

7. The method of claim 6, wherein the first body status information is encrypted before being broadcasted.

8. The method of claim 1, further comprising:
   transmitting, by the wearable computing device, the first body status information comprising addressing the first body status information to a predefined recipient.

9. The method of claim 1, further comprising:
   establishing, by the wearable computing device, an exclusive pair connection with a pairing device via a wireless personal area network pair connection channel by the wireless communications interface, performing the transmission of the first body status information via an auxiliary channel other than the wireless personal area network pair connection channel, and sustaining the exclusive pair connection while performing the transmission of the first body status information.

10. The method of claim 9, further comprising:
    transmitting, by the wearable computing device, of the first body status information with a higher transmission power than a predefined upper limit of transmission power specified for the exclusive pair connection channel.

11. The method of claim 1, the first body status information is selected from a group consisting of one or more an acceleration, a geographic position, a geographic velocity, and a loudness level, the second body status information comprising one or more of a heart rate, a body temperature, a skin conductance, a breathing frequency, a blood sugar level, a posture angle, and a step frequency.

12. The method of claim 1, wherein the fulfillment of the crowd detection criterion comprises that a currently detected number of the other wearable computing devices and/or a current average velocity of the other wearable computing devices, as respectively indicated by the external information, exceeds a respective predefined third threshold.

13. The method of claim 1, further comprising:
    transmitting, by the wearable computing device, the first body status information within ten seconds after the acquisition of the first body status information.

14. The method of claim 1, further comprising:
    excluding, by the wearable computing device, identifying information of the wearable computing device and/or the person from the transmission of the first body status information.

15. The method of claim 1, wherein the external information comprising a pairing request broadcasted by one of the other wearable computing devices while scanning for a potential external pairing device, and/or a communication signal transmitted on an exclusive wireless personal area network pair connection channel between one of the other wearable computing devices and an assigned external pairing device.

16. A computer program product for operating a wearable computing device comprising:
    one or more non-transitory computer-readable storage media and program instructions stored on the one or more non-transitory computer-readable storage media, the program instructions comprising:
    program instructions to acquire a first body status information of a person from a first data acquisition unit, wherein the person is wearing the wearable computing device;
    program instructions to receive external information from other wearable computing devices via a wireless communication interface;
    program instructions to in response to a fulfillment of a predefined crowd detection criterion by the external information, automatically transmitting the first body status information by the wireless communications interface;
    program instructions to acquire a second body status information of the person, wherein the second body status information is acquired by a second data acquisition unit; and
    program instructions to in response to the fulfillment of the crowd detection criterion comprising that an indicator quantity described by or derived from the external information exceeds predefined first threshold, wherein the fulfillment of the crowd detection criterion further comprises that the indicator quantity exceeds a predefined second threshold, wherein exceedance of the second threshold includes exceedance of the first threshold.

17. The computer program product of claim 16, wherein the acquisition of the first body status information comprises sensing a physiological function of the person, wherein the first body status information being based on the physiological function.

18. A system comprising a wearable computing device, the computer system comprising:
 one or more computer processors, one or more computer-readable storage media, and program instructions stored on the one or more of the computer-readable storage media for execution by at least one of the one or more processors, the program instructions comprising:
  program instructions to acquire a first body status information of a person from a first data acquisition unit, wherein the person is wearing the wearable computing device;
  program instructions to receive external information from other wearable computing devices via a wireless communication interface;
  program instructions to in response to a fulfillment of a predefined crowd detection criterion by the external information, automatically transmitting the first body status information by the wireless communications interface;
  program instructions to acquire a second body status information of the person, wherein the second body status information is acquired by a s second data acquisition unit; and
  program instructions to in response to the fulfillment of the crowd detection criterion comprising that an indicator quantity described by or derived from the external information exceeds predefined first threshold, wherein the fulfillment of the crowd detection criterion further comprises that the indicator quantity exceeds a predefined second threshold, wherein exceedance of the second threshold includes exceedance of the first threshold.

19. The computer system of claim 18, wherein the acquisition of the first body status information comprises sensing a physiological function of the person, wherein the first body status information being based on the physiological function.

* * * * *